US005591324A

United States Patent [19]

Monque et al.

[11] Patent Number: 5,591,324

[45] Date of Patent: Jan. 7, 1997

[54] HYDROPROCESSING SCHEME FOR PRODUCTION OF PREMIUM ISOMERIZED LIGHT GASOLINE

[75] Inventors: Reinaldo Monque, Caracas; Wolfgang Garcia, Edo Miranda; Roberto Galiasso, San Antonio; Jose A. Perez, Edo Miranda, all of Venezuela

[73] Assignee: Intevep, S.A., Caracas, Venezuela

[21] Appl. No.: 446,901

[22] Filed: May 17, 1995

Related U.S. Application Data

[62] Division of Ser. No. 247,319, May 23, 1994.

[51] Int. Cl.[6] .......... C10G 45/04

[52] U.S. Cl. .......... 208/216 R; 208/213; 208/120

[58] Field of Search .......... 208/213, 216 R, 208/120

[56] References Cited

U.S. PATENT DOCUMENTS

| | | | |
|---|---|---|---|
| 4,827,076 | 5/1989 | Kokayeff et al. | 585/737 |
| 4,986,894 | 1/1991 | Keville | 208/27 |
| 5,019,661 | 5/1991 | Mole | 585/253 |
| 5,023,389 | 6/1991 | Grandvalle et al. | 585/304 |
| 5,149,679 | 9/1992 | Price et al. | 502/61 |
| 5,264,116 | 11/1993 | Apelian et al. | 208/111 |
| 5,281,566 | 1/1994 | Marcilly et al. | 502/61 |
| 5,290,427 | 3/1994 | Fletcher et al. | 208/89 |
| 5,298,150 | 3/1994 | Fletcher et al. | 208/89 |

FOREIGN PATENT DOCUMENTS

| | | | |
|---|---|---|---|
| 92310061 | 6/1992 | European Pat. Off. | C10G 45/12 |

*Primary Examiner*—Helane Myers
*Attorney, Agent, or Firm*—Bachman & LaPointe, P.C.

[57] ABSTRACT

A hydroconversion catalyst composition includes a catalytically active matrix having a surface area of between about 50 $m^2/g$ to about 290 $m^2/g$, a silicious molecular sieve support medium distributed through the matrix and having a surface area of between about 250 $m^2/g$ to about 1200 $m^2/g$ and a catalytically active phase supported on the support medium and including a first metal selected from group IIIA of the periodic table of elements and a second metal selected from group VIB of the periodic table of elements. The matrix preferably further includes aluminum, gallium, cobalt, molybdenum, and phosphorus.

9 Claims, No Drawings

HYDROPROCESSING SCHEME FOR PRODUCTION OF PREMIUM ISOMERIZED LIGHT GASOLINE

This is a Division, of application Ser. No. 08/247,319, filed May 23, 1994.

REFERENCE TO DISCLOSURE DOCUMENT

This application is related to Disclosure Document No. 315,453 filed Jun. 15, 1992 with the U.S. Patent and Trademark Office.

BACKGROUND OF THE INVENTION

The present invention relates to a process for hydroconversion of light and heavy feedstock, especially heavy naphtha feedstock, to a catalyst for use in hydroconversion processes with a feedstock having sulfur and nitrogen contaminants and to a process for providing such a catalyst.

Light naphtha feedstock can be treated by hydroconversion to produce premium isomerized light gasoline blending components. Numerous catalysts including the various zeolite catalysts are useful in such processes. Heavy naphtha feedstock would also be a useful source of blending components. However, conventional zeolite catalysts are rapidly deactivated by sulfur, nitrogen, coke, and other contaminants which may be present in heavy naphtha feedstock.

U.S. Pat. No. 4,734,539 to Lawlor et al. discloses such a catalyst which is useful in some applications. However, the catalyst of Lawlor et al. is susceptible to sulfur deactivation and has a one dimensional pore system which leads to rapid deactivation by coke as well. U.S. Pat. No. 4,962,269 to LaPierre et al. also discloses a process for isomerization using zeolite catalyst. However, LaPierre et al. use Y or ZSM-20 zeolite, which is a specialty product (and therefore increases the cost of the process). LaPierre et al.'s process also leads to an undesirable increase in aromatics.

It is the primary object of the invention, therefore, to provide a process for hydroconversion of a heavy naphtha feedstock having a high content of sulfur and nitrogen contaminants so as to provide useful gasoline blending products.

It is a further object of the invention to provide a catalyst for hydroconversion processes which is not significantly deactivated by sulfur, nitrogen and coke.

It is a still further object of the invention to provide such a hydroconversion catalyst which provides significant levels of isomerization without increasing the output of aromatics.

It is another object of the invention to provide a process for preparing a catalyst in accordance with the invention.

Other objects and advantages will appear hereinbelow.

SUMMARY OF THE INVENTION

In accordance with the invention, the foregoing objects and advantages are readily attained.

In accordance with the invention, a catalyst system is disclosed which comprises a catalytically active matrix; a support medium distributed through the matrix and comprising a silicious molecular sieve material; and a catalytically active phase supported on the support medium and comprising a first metal selected from group IIIA of the periodic table of elements and a second metal selected from group VIB of the periodic table of elements.

Preferably, the catalyst systems comprises a catalytically active matrix comprising a first metal selected from group IIIA of the periodic table of elements, a second metal selected from group IIIA, a third metal selected from group VII, a fourth metal selected from group VIB, and a fifth metal selected from group VA; a support medium distributed through the matrix and comprising a silicious molecular sieve material; and a catalytically active phase supported on the support media and comprising a group IIIA metal and a group VIB metal.

In further accordance with the invention a process is disclosed for upgrading sulfur rich heavy naphtha feedstock which process comprises the steps of providing a heavy naphtha feedstock having an initial sulfur content and an initial octane number; and contacting said feedstock with a hydroconversion catalyst system under a hydrogen atmosphere at hydroisomerization temperature and pressure so as to provide a final product having a final sulfur content which is less than the initial sulfur content of the feedstock, and having a final octane number which is substantially equal to or greater than said initial octane number of the feedstock, and wherein the final product has an increased isomerized component and substantially no increase in aromatic content with respect to said feedstock.

A two stage process wherein the feedstock is first hydrodesulfurized and then upgraded is also disclosed.

A process is also disclosed in accordance with the invention for providing the catalyst systems of the invention, which process comprises the steps of providing a support medium comprising a silicious molecular sieve material having a surface area of between about 250 $m^2/g$ to about 1200 $m^2/g$ and supporting a catalytically active phase comprising a first metal selected from group IIIA of the periodic table of elements and a second metal selected from group VIB of the periodic table of elements; providing a matrix material having a surface area of between about 50 $m^2/g$ to about 290 $m^2/g$; mixing said support medium with said matrix to form a substantially homogeneous paste having a ratio by weight of said support medium to said matrix of at least about 0.1; forming said paste into catalyst elements; and calcining said catalyst elements whereby at least a portion of said first metal of said catalytically active phase migrates from said support medium to said matrix whereby said matrix is catalytically active.

DETAILED DESCRIPTION

The invention relates to a catalyst system, particularly a hydroconversion catalyst for use in hydroisomerization of naphtha feedstocks including heavy naphtha, cracked naphtha, straight run naphtha and the like so as to isomerize the feedstock and provide gasoline or gasoline additives having improved RON/MON values. In accordance with the invention, the catalyst also reduces sulfur and nitrogen levels in the feedstock without rapid deactivation of the catalyst, and prevents increases in undesirable aromatics production.

The catalyst of the invention includes a catalyst system comprising a matrix, a support medium within or distributed through the matrix, a catalytically active phase supported on or incorporated within the matrix so as to render the matrix catalytically active, and a catalytically active phase supported on the support medium.

The matrix preferably includes aluminum, preferably in the form of a mesoporous or gamma alumina matrix, and supports a catalytically active phase which includes a group IIIA metal, preferably gallium.

In accordance with the most preferred embodiment of the invention, the matrix further includes or supports additional metals which round out the active phase of the matrix. These metals include a group VIII metal, preferably nickel or cobalt, most preferably cobalt; a group VIB metal, preferably chromium or molybdenum, most preferably molybdenum, and a group VA metal, preferably phosphorus. Of the foregoing metals, the total ratio in the final catalyst by weight of cobalt to molybdenum is preferably between about 0.5 to 5, and the total ratio by weight of phosphorus to molybdenum is preferably at least about 0.4. This combination of metals provides the catalyst system with significantly improved and unexpected characteristics as demonstrated by the Examples discussed below.

The gallium, cobalt or nickel, molybdenum and phosphorus of the matrix active phase serve to render the matrix catalytically active so as to increase the activity of the catalyst system towards the desired dehydrogenation and hydrodesulfurization reactions.

The matrix preferably has a surface area of between about 50 $m^2/g$ to about 290 $m^2/g$. The matrix is "mesoporous" in that the pore diameter of the matrix is preferably in the range of about 20 Å to about 500 Å. The matrix also preferably has a particle size distribution wherein at least 95% of the particles are smaller than 200 microns, at least 85% smaller that 90 microns, at least 60% smaller than 45 microns, and at least 40% smaller than 25 microns.

The physical characteristics of the matrix as set forth above serve to allow sufficient access of potentially heavy feedstock molecules to the support medium and catalytically active metals distributed through or supported on the matrix.

The support medium is preferably a hydrothermally stable porous crystalline silicious molecular sieve material such as zeolite catalyst or other metallosilicate, especially aluminosilicate. The support medium is preferably an MFI type zeolite such as ZSM-5 or ZSM-12 zeolite, and, according to the invention, excellent results are provided by using a mixture of ZSM-5 and ZSM-12 as will be set forth and demonstrated below. The support medium preferably has a surface area of between about 250 $m^2/g$ to about 1200 $m^2/g$. The support medium is also preferably characterized by XRD techniques as showing lines between 22° and 25° of 2Θ, in particular those lines located at (23, 06), (23, 226) and (23, 856) for A and those located at (20, 90), (22, 90) and (23, 17) for B, as main lines. The support medium preferably has an Si/A1 atomic ratio of at least about 10, preferably between about 10 to about 200.

The catalytically active phase which is supported on the support medium preferably includes a plurality, preferably two, catalytically active metals. One metal is a group IIIA metal, preferably gallium or boron and most preferably gallium, and the other is a group VIB metal, preferably chromium. Gallium and chromium are each present as oxides in the final catalyst in an amount of between about 0.01% to about 5.0% by weight of the catalyst. Further, the total ratio by weight in the catalyst of gallium to chromium is preferably between about 1 to about 10. The final catalyst further exhibits a ratio of Si to M, where M is defined as the group IIIA metal other than aluminum plus the group VIB metal, of between about 10 to about 50.

The final catalyst preferably has a chemical surface composition characterized by the following atomic ratios: Si/A1=0.01–1.0; Si/Ga=10 –250; Si/Cr=1–50; and Si/(Ga+A1+Cr+Mo+Co+P)=0.001–5.0. The catalyst preferably has a particle diameter of between about 0.5 mm to about 3 mm, a surface area of between about 140 $m^2/g$ to about 250 $m^2/g$, a pore volume of between about 0.3 cc/g to about 0.9 cc/g; and a pore diameter of between about 60 Å to about 140 Å.

The catalyst according to the invention exhibits improved isomerization without increasing aromatics as shown in the Examples to follow, and also possesses resistance to deactivation by sulfur, nitrogen and coke contaminants.

Catalyst according to the invention may be prepared, according to the invention, as follows.

The zeolite support medium is provided initially supporting the desired catalytically active phase, preferably gallium and chromium. The gallium and chromium elements may be deposited on or supported by the zeolite by any means known in the art such as impregnation, exchange, direct syntheses, and the like. In this regard, the zeolite with metals may suitably be directly synthesized in accordance with the method disclosed in co-pending and commonly assigned U.S. patent application Ser. No. 08/055,089 filed May 3, 1993.

If the metals are to be impregnated onto the zeolite support, it is preferable to impregnate the chromium first, followed by the gallium, so that a good distribution of the chromium can be ensured.

Impregnation is preferably carried out with a salt of the metal in an aqueous medium. Preferable salts include $Cr(NO_3)_2.9H_2O$ and $Ga(NO_3)_2.9H_2O$, although others are suitable. Dissolving the salt in the aqueous medium allows an effective exchange or impregnation of the metal into the molecular sieve.

Each impregnation is preferably followed by a drying step. The drying steps may be carried out at a temperature of between about 80° C. to about 150° C., preferably about 120° C., under a flow of air containing water vapor equivalent to about 0.5 kg $H_2O$/hour-kg of catalyst for a period of between about 1 hour to about 6 hours.

The zeolite support in accordance with the invention is provided with an amount of gallium and chromium to provide the final catalyst composition with between about 0.01% wt to about 5.0% wt of each metal in oxide form. The zeolite support also preferably has a resulting Si/M atomic ratio, where M is the total active phase metal, of between about 0.01 to about 5.0.

After incorporation of the metals, which may be in oxide form, the support with metal is mixed with the alumina gel matrix material to form a substantially homogeneous paste. The paste may at this point be extruded or otherwise formed into any desired form such as, for example, cylindrical, trilobe and/or quadrilobe shapes, granules, particles or any other form in which it is desirable to provide the catalyst system of the present invention, which shapes and/or forms are collectively referred to herein as catalyst elements.

The catalyst elements are then impregnated with aqueous solutions(s) containing a mixture of the salts of the desired group VIII, VIB and VA metals. Preferred salt solutions include $Mo_7O_{23}(NH_4)_6.4H_2O$ (ammonium heptamolybate); $Co(NO_3)_2.6H_2O$ (cobalt nitrate); $H_3PO_4$ (phosphoric acid) and the like. The impregnated catalyst elements are then dried as described above so as to leave the desired metals deposited or impregnated onto the matrix. Of course, the desired metals may be incorporated or deposited in numerous other ways which are known to those skilled in the art. Further, the metals may also be incorporated onto the matrix prior to mixing with the support medium if desired.

Once the desired metals are in place on both the matrix and support medium, the catalyst elements are then calcined in accordance with the invention so as to provide the final catalyst product.

During the calcining procedure, a portion of the gallium originally supported on the zeolite support migrates to the alumina gel (matrix) portion of the catalyst to provide the above-mentioned surface ratios with respect to gallium. Thus, the matrix of the final catalyst comprises an alumina matrix supporting gallium in addition to the cobalt, molybdenum and phosphorus which, as set forth above, are critical in providing the desired operation of the catalyst system in accordance with the invention.

In accordance with the invention, calcining is carried out at a temperature of about 600° C. for a period of about 6 hours under a flow of air containing water vapor equivalent to about 0.5 kg $H_2O$/hour-kg of catalyst. Preferably, calcining is carried out in two stages. The first calcining stage is carried out between about 120° C. to about 350° C. for about 1–6 hours, and the second stage is carried out between about 350° C. to about 700° C. for about 1–6 hours.

The process as set forth above provides the catalyst of the invention which yields excellent isomerization of naphtha feedstock without increased aromatic production and which catalyst is resistant to deactivation from sulfur, nitrogen and coke. In accordance with the process, gallium is transferred from the support medium to the matrix where it is functional to help provide the improved characteristics of the catalyst. In accordance with the most preferred embodiment of the invention, the transferred gallium along with the cobalt, molybdenum and phosphorus of the matrix serve to provide enhanced reduction of and resistance to sulfur and nitrogen contaminants in the feedstock, and provide excellent activity of the catalyst toward the desired isomerization reaction without increasing aromatics production so as to yield upgraded products having increased octane number.

In use, the catalyst is preferably contacted with the feedstock under process conditions effective to provide the desired reaction, typically including a pressure of between about 1 bar to about 50 bars, a temperature of between about 250° C. to about 450° C., a space velocity of between about 0.1 to about 3 $h^{-1}$, a recycle gas ratio of between about 30 to about 1000 standard l/l of feed and a recycle liquid ratio of between about 1 to about 10 l/l of feed. A minimum hydrogen partial pressure at the inlet of the reaction stage is adjusted to between about 0.5 bar to about 40 bars depending upon the total pressure, generally representing about 50% hydrogen purity in the recycle stream.

The catalyst according to the invention is preferably installed in a reactor in a number of reaction stages which may be in fixed bed and/or combined bed arrangement. The process may include one or more reaction stages, swing reaction stages, liquid and gas recycle and the like, all as is known in the art. The catalyst is preferably provided in a particle diameter of about 0.5 mm to about 3.0 mm in a dense load.

A plurality of parallel reactors may also suitably be used, along with a control or sensor device to take a reactor off stream when it is ready for regeneration.

The preferred feedstock has a sulfur content of between about 1 to about 8500 ppm, although feedstocks having a sulfur content up to about 50,000 ppm may be satisfactorily treated in accordance with the invention.

A hydrodesulfurization step may be useful when large concentrations of sulfur are present in the feedstock. Conventional hydrodesulfurization techniques may be used to reduce sulfur content by factors greater than 60%. However, such sulfur reduction is frequently accompanied by loss of octane number. In accordance with the invention, such a desulfurized intermediate produce may be contacted with the catalyst system of the present invention so as to provide a final product having a further reduced sulfur content, a large fraction of isomerized product, increased octane number (which is generally increased at least to and potentially exceeding the original octane number of the feed), and no substantial increase in aromatics production. Hydrodesulfurization is generally preferred for feedstocks having sulfur content exceeding 20,000 ppm, preferably exceeding 1,000 ppm, and up to about 50,000 ppm.

The feed to be contacted with the catalyst system of the invention preferably has a sulfur content of between about 1 ppm to about 20,000 ppm, although such feedstock generally contains a minimum of at least 50 ppm of sulfur.

The feedstock may also have a nitrogen content of up to about 200 ppm, preferably no greater than about 25 ppm. In accordance with the invention, the catalyst system is substantially unaffected by these amounts of nitrogen and may be useful in reducing nitrogen in the feedstock during hydroconversion processes.

The final product after contact with the catalyst system according to the invention is characterized by an upgraded product having improved characteristics. The final product exhibits an increase in isomerized component of about 5–20%. Sulfur is reduced in varying amounts depending upon whether a hydrodesulfurization step is used. If a hydrodesulfurization step is used, sulfur may be reduced by greater than 60%, typically between about 60% to about 70%. If the feedstock is fed directly to the hydroconversion catalyst of the present invention, sulfur reduction is typically at least about 20% to about 40% and may be as great as about 30% to about 70%. The final product also exhibits a substantially unchanged aromatic content, and an octane number greater than about 85 RON (83 MON). The actual increase in octane number, of course, depends upon the feedstock. A heavy straight run naphtha may typically be increased by about 30 to about 40 RON, while a heavy cracked naphtha cut may be increased by about 2 to about 10 RON.

The final product resulting from contact with the hydroconversion catalyst according to the invention also exhibits improved distillation temperature or T90 values, as will be demonstrated in the examples to follow.

EXAMPLE 1

This example illustrates the preparation of two catalysts according to the invention. The chemical compositions of the two catalysts are set forth below in Table 1. The catalysts were prepared as follows.

H-ZSM5 zeolite was provided as the support medium and impregnated with aqueous solutions of $Cr(NO_3)_3.H_2O$ and $Ga(NO_3)_3.9H_2O$. The impregnated zeolite was combined with a gamma alumina matrix to form a substantially homogeneous paste, which was extruded and dried. The extruded catalyst elements were then impregnated with aqueous solutions of $M_{07}O_{23}(NH_4)_6.4H_2O$, $Co(NO_3)_2.6H_2O$ (Catalyst #1), $Ni(NO_3)_2$(Catalyst #2), and $H_3PO_4$. The impregnated solid was then dried and calcined so as to provide the catalysts described in Table 1.

TABLE 1

| Chemical composition of the catalyst | | |
|---|---|---|
| | $CoMoP/Al_2O_3$ + GACR/H-ZSM-5 | $NiMoP/Al_2O_3$ + GaCr/H-ZSM-5 |
| Al (%) | 18.0 | 16.9 |
| Si (%) | 24.0 | 16.4 |
| Mo (%) | 4.87 | 4.9 |
| Co (%) | 3.10 | 0 |
| P (%) | 1.30 | 0.9 |
| Cr (ppm) | 809 | 612 |
| Ga (ppm) | 3773 | 1210 |
| Ni (%) | 0 | 4.1 |
| Mechan. Resist. kg/p | 5.7 | 4.7 |
| Area ($m^2/g$) | 204 | 213 |

The surface composition of catalyst #1 was determined by XPS technique as follows:

TABLE 2

| Elements | % |
|---|---|
| Co ($2p_{3/2}$) | 0.83 |
| Mo (3d) | 1.025 |
| P | 0.54 |
| Al (2p) | 17.43 |
| Si (2P) | 22.68 |
| Ga ($2p_{3/2}$) | 0.16 |
| Cr (1s) | 0.16 |
| | 58.26 |

EXAMPLE 2

This example illustrates the importance of both the active metal supported on the zeolite support medium and also on the matrix. Three catalysts were prepared as shown in Table 3:

TABLE 3

| Catalyst Composition | |
|---|---|
| CATALYST | COMPOSITION |
| A | $CoMoP/Al_2O_3$ + GaCr/H-ZSM-5 |
| B | $CoMoP/Al_2O_3$ + H-ZSM-5 |
| C | $Al_2O_3$ + GaCr/H-ZSM-5 |

Catalyst A is the most preferred catalyst according to the invention, and has active phases on both the matrix and zeolite support. Catalyst B does not have active metal on the zeolite. Catalyst C has active metal on the zeolite, but does not include the CoMoP metals on the matrix which only has a portion of Ga transferred during calcination as described above.

Catalysts A, B and C were used in hydroisomerization of n-octane at a temperature of 350° C., pressure of 400 psi, $H_2$/n–C8 ratio of 7.33 v/v and a LHSV of 3.75 $h^{-1}$. Table 4 contains the results obtained.

TABLE 4

| | CATALYST A | CATALYST B | CATALYST C |
|---|---|---|---|
| Total Conversion (%) | 54.46 | 70.68 | 52.22 |
| Gas Yield (%) | 14.87 | 36.35 | 19.43 |
| Liquid Yield ($C_{5+}$) (%) | 39.60 | 34.32 | 33.04 |

TABLE 4-continued

| | CATALYST A | CATALYST B | CATALYST C |
|---|---|---|---|
| Gas Product Selectivity (%) | 27.30 | 51.43 | 37.21 |
| $C_{5+}$ Liquid Product Selectivity (%) | 72.70 | 48.57 | 63.29 |
| Saturated Linear Products (%) | 5.79 | 9.35 | 5.18 |
| Isomers $C_{5+}$ (%) | 49.72 | 32.36 | 38.64 |
| Unsaturated Liquid Products (%) | 0.70 | 1.04 | 0.46 |
| Cyclic Products (%) | 10.55 | 5.43 | 9.10 |
| Aromatics (%) | 5.94 | 0.39 | 9.41 |

As shown, Catalyst A provides the highest selectivity toward isomers and the lowest gas formation. Catalyst B exhibits a relatively high gas product selectivity, but is lowest in the desired isomer formation. Catalyst C, formulated in accordance with the broader aspect of the invention, provides less total conversion and less selectivity toward $C_{5+}$liquid products, but good isomerization.

Thus, in accordance with the invention, Catalyst A having active phases containing Ga+Cr as well as Co, Mo and P provides the best results.

Catalyst C, also formulated in accordance with the invention so as to have gallium transferred to the matrix, also provides desirable results.

EXAMPLE 3

Catalyst A of Example 2 was further used in hydroisomerization of heavy virgin naphtha under hydroconversion conditions similar to Example 2 but at different pressures of 150 and 400 psig so as to demonstrate the effect of pressure on the hydroisomerization process of the present invention. Table 5 contains the results.

TABLE 5

| | FEED | PRODUCTS | |
|---|---|---|---|
| Pressure (psig) | | 150 | 400 |
| API | 58.9 | 58.0 | 61.0 |
| Sulfur (ppm) | 94 | 49 | 25 |
| Nitrogen (ppm) | <1 | <1 | <1 |
| Br number | <1 | <1 | <1 |
| RVP (psi) | 2.81 | 5.60 | 7.0 |
| RON | 57.9 | 69.6 | 80.0 |
| MON | 57.0 | 69.6 | 80.0 |
| Paraffins (% V) | 56 | 49 | 52 |
| Olefins (% V) | 0 | 1 | 0 |
| Naphtenes (% V) | 32 | 33 | 31 |
| Aromatic (% V) | 12 | 17 | 16 |
| Simulated Distillation °F. (T90) | | | |
| 0/10 | 133/169 | 81/160 | 77/138 |
| 30/50 | 214/248 | 210/244 | 196/239 |
| 70/90 | 284/324 | 282/324 | 270/297 |

As shown, the process improves as pressure increases from 150 to 400 psig. Specifically, sulfur reduction, RON, API gravity and T90 are all improved. Note also that aromatic and olefin content remain substantially unchanged as desired, and that the Reid vapor pressure remains below 9 psi.

EXAMPLE 4

This example illustrates a two stage process using a commercial hydrodesulfurization catalyst and process followed by hydroconversion using Catalyst A of Example 2 according to the invention. Hydrodesulfurization was carried out at 340° C. and 400 psig, and a ratio of $H_2$/HC of 500 Nv/v and LHSV of 1.0 $h^{-1}$. Hydroisomerization of the intermediate product was then carried out at 330° C., 700 psig, $H_2$/HC ratio of 500 Nv/v and LHSV of 0.75 $h^{-1}$. The results are contained in Table 6.

TABLE 6

| | Heavy Cracked Naphtha | Hydro-desulfurization Intermediate | Hydro-isomerization Final Product |
|---|---|---|---|
| API | 46.3 | 52.3 | 56.5 |
| Sulfur (ppm) | 8910 | 31 | <20 |
| RON | 77 | 44 | 81 |
| T90 (°F.) | 410 | 385 | 334 |
| Br No. | 78 | <1 | <1 |
| Yield (% wt.) | | 95 | 90 |

As shown, hydrodesulfurization reduces sulfur, but octane number (RON) as well. The catalyst of the present invention restores the lost octane number to a level higher than the feed, further reduces sulfur content, increases API gravity, and reduces T90, all as desired in accordance with the present invention.

EXAMPLE 5

This example illustrates a two stage process similar to Example 4 but using a heavy FCC naphtha feedstock and Catalyst A of Example 2.

Hydrodesulfurization was carried out at 340° C., 400 psig, $H_2$/HC ratio of 500 Nv/v and LLISV of 1.0Oh$^{-1}$. Hydroisomerization was then carried out at 330° C., 700 psig, $H_2$/HC ratio of 500 Nv/v and LHSV of 0.75$^{-1}$. The results of this example are set forth below in Table 7.

TABLE 7

| | Heavy FCC Naphta | Hydro-desulfurization Intermediate | Hydro-isomerization Final Product |
|---|---|---|---|
| API | 33.2 | | |
| Sulfur (ppm) | 3820 | 30 | 28 |
| RON | 92.8 | 88.1 | 91 |
| T90 (°F.) | 459 | 385 | 455 |
| Br No. | 11 | | |
| $C_{5+}$ (% wt.) | | | 94 |

As shown, sulfur content is further reduced by Catalyst A, and RON is restored almost to the original value.

EXAMPLE 6

This example demonstrates that an atmospheric straight-run naphtha with low sulfur content (60 ppm) can be treated with the catalyst of the present invention to provide transformation to more suitable isomerized hydrocarbon products with high RON and MON values, and low RVP (Reid Vapor Pressure) and aromatic content, by contacting the feedstock with the catalyst under the following conditions:

Reaction temperature=280° C–320° C.

Total Pressure=200 psig $H_2$/HC feedstock molar ratio=3

L.H.S.V. =1–2h$^{-1}$

The feedstock is pre-heated by means of conventional heat-exchanger with product stream before contact with the catalyst of the present invention. Table 8 sets forth the volumetric boiling point distribution (T90) obtained after reaching the steady state of reaction. Benefits obtained by use of the catalyst of the present invention can be summarized as follows: low RVP; good HDS activity (sulfur removal); high content of light and medium isomerized product with high octane number (RON and MON); and the original content of aromatics which remain unchanged through the reaction.

TABLE 8

| | Feedstock and product properties | |
|---|---|---|
| | Feedstock | Product |
| Dist (% vol.) | | |
| IBP–10 | 36–86 | 95–98 |
| 30–50 | 101–117 | 103–109 |
| 70–90 | 135–157 | 114–119 |
| FBP | 195 | 125 |
| API gravity | 55 | 65 |
| Octane RON | 55 | 85 |
| Aromatics (% vol.) | 17 | 17 |
| Sulfur | 60 ppm | 5 ppm |

EXAMPLE 7

This example demonstrates that light cuts of FCC (65° C–170° C. ) with moderate content of sulfur (600 ppm) can also be used directly as regular feedstock to the catalyst of the present invention to produce light isomerized gasoline with high RON and MON, with no aromatic production, good sulfur removal and a better resulting RVP.

The example was run by contacting the feedstock with the catalyst under the following conditions:

Reaction temperature=320° C–350° C.

Total Pressure=400 psig $H_2$/HC feedstock ratio=5

L.H.S.V. =0.75h$^{-1}$

The feedstock was pre-heated by means of conventional heat-exchanger with product stream before contact with the catalyst of the present invention. Volumetric boiling point distribution obtained after reaching the steady state of reaction is presented and compared in Table 9.

TABLE 9

| | Feedstock and product properties | |
|---|---|---|
| | Feedstock | Product |
| Dist (% vol.) | | |
| IBP–10 | 72–84 | 65–73 |
| 30–50 | 92–117 | 83–95 |
| 70–90 | 139–150 | 107–122 |
| FBP | 162 | 148 |
| API gravity | 55 | 57 |
| Octane RON | 92.6 | 95.2 |
| Sulfur | 600 ppm | 74 ppm |

The product was a light isomerized gasoline having a high RON number, improved RVP and less sulfur with no aromatic production.

EXAMPLE 8

This example demonstrates that the catalyst of the invention must include an MFI type zeolite (or metallosilicate) rather than other types of zeolite because of its selectivity toward light isomerized products from either straight-run or heavy cracked naphtha, with or without high sulfur content. In this example, and also in Examples 9–11 to follow, cobalt, molybdenum and phosphorus metals were not added to the matrix so as to more clearly demonstrate the influence of a change in zeolite.

Preparation of GaCr/HY(non-MFI) catalyst

The catalyst is prepared by an identical procedure used to prepare the MFI based catalyst. 100 g of commercial HY zeolite are impregnated with aqueous solutions of $Cr(NO_3)_3.9H_2O$ and $Ga(NO_3)_3.9H_2O$, until a total amount of about 0.01% to 5% by weight metals are present and the Ga/Cr atomic ratio is in the range of 1 to 10. The impregnated support medium was combined with a matrix (alumina) so as to form homogeneous paste which was extruded and then calcined.

This catalyst was then compared with the MFI based catalyst prepared according to the invention, formed with same metals and amounts and prepared by identical procedure on a commercial H-ZSM-5 zeolite. The results are set forth below in Table 10.

TABLE 10

| | Activity and selectivity of the catalysts | |
|---|---|---|
| | GaCr/Hy + alumina | GaCr/ZSM-5 + alumina |
| Liquid yield (%) | 46.81 | 59.88 |
| BTX (%) | <1 | <1 |
| Isomers $C_{5+}$ (%) | 3.73 | 34.72 |
| I/C ratio | <1 | 1.04 |
| Gas yield (%) | 53.19 | 40.12 |
| $C_1$–$C_4$ (%) | 77.28 | 94.55 |
| $C_3$ = (%) | 22.72 | 5.45 |

Table 10 clearly shows the improved activity, selectivity and stability of GaCr/ZSM-5 catalyst to produce light isomerized gasoline from similar feedstock at the same operational conditions used to run Example 6, rather than the undesirable cracking and dehydrogenating activity exhibited by GaCr/HY catalyst under the same conditions and with the same feedstock.

EXAMPLE 9

This example demonstrates that the support medium of the catalyst must include both gallium and chromium to produce the best catalytic isomerization of naphtha feedstock (cracked or not). Three catalysts are prepared, one with only gallium (Ga/ZSM-5), one with only chromium (Cr/ZSM-5), and the third with both gallium and chromium in accordance with the invention (GaCr/ZSM-5). Each catalyst was prepared so as to contain the same total amount of gallium, chromium, and gallium plus chromium, respectively.

Preparation of Ga/ZSM-5 catalyst:

This catalyst is prepared by an identical procedure used to prepare the GaCr/ZSM-5 based catalyst of the present invention. 100 g of the same commercial HZSM-5 zeolite used to prepare the GaCr based catalyst are impregnated with an aqueous solution of $Ga(NO_3)_3.9H_2O$, as the only active metal present. The impregnated support medium was combined with the alumina matrix so as to form a homogeneous paste which was extruded and then calcined.

Preparation of a Cr/ZSM-5 catalyst

This catalyst is prepared by an identical procedure used to prepare the GaCr/ZSM-5 based catalyst of the present invention. 100 g of the same commercial HZSM-5 zeolite used to prepare the GaCr based catalyst are impregnated with an aqueous solution of $Cr(NO_3)_3.9H_2O$, as the only active metal present. The impregnated support medium was combined with the alumina matrix so as to form a homogeneous paste which was extruded and calcined.

These catalysts were compared with the GaCr/ZSM-5 based catalyst, formed with same metals and amounts and prepared by identical procedure on the same commercial H-ZSM-5 zeolite. The results are set forth below in Table 11.

TABLE 11

| | Activity and selectivity of the catalysts | | |
|---|---|---|---|
| | Ga/ZSM-5 + alumina | Cr/ZSM-5 + alumina | GaCR/ZSM-5 + alumina |
| Liquid | | | |
| yield (%) | 10.16 | 56.55 | 59.88 |
| BTX (%) | >89 | <1 | <1 |
| Isomers | | | |
| $C_5$ + (%) | 2.13 | 10.62 | 34.72 |
| I/C ratio | 1.02 | 1.03 | 1.04 |
| Gas yield (%) | 89.84 | 43.45 | 40.12 |

Table 11 clearly shows the improved activity, selectivity and stability of the GaCr/ZSM-5 catalyst according to the invention to produce light isomerized gasoline from similar feedstock at the same operational conditions used to run Example 6. Undesirable side-reactions, such as aromatization in the case of Ga/ZSM-5 catalyst, and cracking and dehydrogenating activity in the case of Cr/ZSM-5 catalyst, are favored if Ga and Cr are not both present in the final catalyst.

EXAMPLE 10

The catalyst of the present invention was analyzed to show that the final catalyst, after activation (or calcination), has a gallium enrichment on the surface of the catalyst which is believed to result from a shift of gallium from the support medium to the matrix to provide a $Ga_2O_3/A1_2O_3$ matrix having catalytic activity.

Preparation of GaCr/ZSM-5 catalyst 100 g of commercial ZSM-5 zeolite are impregnated with aqueous solutions of $Cr(NO3)_3.9H_2O$ and $Ga(NO_3)_3.9H_2O$ until a total amount of about 0.01% to 5% by weight of such metals are present and the Ga/Cr atomic ratio is in the range of 1 to 10. The impregnated support medium was combined with alumina matrix so as to form a homogeneous paste, which was extruded and then calcined.

The catalyst surface with and without activation is characterized by using XPS (X-ray Photoelectron Spectroscopy) technique. The relative abundance of elements was tested using an A1 α anode as a source of X-ray emissions. The results obtained are found in Table 12.

TABLE 12

XPS surface characterization of the catalyst with and without calcination

| $GaCr/ZSM-5 + Al_2O_3$ | Dried fresh catalyst | Activated |
|---|---|---|
| Si/Al surface ratio = | 0.1475 | 0.1711 |
| Si/Ga surface ratio = | 8.5968 | 7.4750 |
| Si/Cr surface ratio = | 42.98 | 37.37 |
| Ga/Si + Al + Cr surface ratio = | 0.015 | 0.020 |
| Area superficial BET = 300 +/− 10 $m^2/g$ | | |

Fresh catalyst simply dried exhibits less gallium at the surface of the catalyst (high Si/Ga ratio) than the activated one (low Si/Ga ratio). The activated catalyst also showed less aluminum and more chromium at the surface. Thus, the activation step provides a gallium enrichment on the surface of the catalyst resulting from the shift of the gallium to the matrix so as to enhance the catalytic activity of the matrix.

EXAMPLE 11

This example demonstrates that the shift of gallium to the matrix to form $Ga_2O_3/Al_2O_3$ makes the matrix a catalytically active phase that provides more activity to the final catalytic system.

To run this test, a sample of $Ga_2O_3/Al_2O_3$ mixture is prepared by conventional procedure and placed in the reactor under the same reaction conditions used in Example 6.

Another test is run under the same conditions of Example 6, using unextruded (no alumina content) GaCr/ZSM-5 as catalyst.

The results obtained were compared with Example 6.

Table 13 clearly shows that the catalyst GaCr/ZSM-5 $+Al_2O_3$ of the invention exhibits more activity for this reaction than the sum of activities observed with the simple mixture of GaCr/ZSM-5 catalyst and $Ga_2O_3/Al_2O_3$, with less gas yield and significantly more isomer production. The mixture also exhibited more aromatics and coke formation. Furthermore, this comparison also demonstrates that the claimed catalyst is a more stable and selective catalyst for this process.

TABLE 13

Activity and selectivity of the catalysts
Quality product distribution (Run time = 6 hours)

| | $Ga_2O_3/Al_2O_3$ | GaCr/ZSM-5 | $GaCr/ZSM-5 + Al_2O_3$ |
|---|---|---|---|
| Total conversion (%) | 3.58 | 43.88 | 52.18 |
| Gas yield ($C_1$–$C_4$) (%) | 14.01 | 25.63 | 19.43 |
| Liquid yield ($C_5^+$) (%) | 85.99 | 74.37 | 80.57 |
| Isomers ($C_5^+$) (%) | 0.01 | 28.76 | 30.80 |
| Cyclic products (%) | >0.01 | 1.48 | 2.11 |
| Saturated linear products (%) | 98.57 | 10.64 | 8.15 |
| Unsaturated liquid products (%) | >0.05 | 1.53 | 4.85 |
| Aromatic products (%) | >0.01 | 0.78 | 1.88 |
| Coke (%) | 1.34 | 2.89 | 4.56 |

These results clearly confirm the regenerability, stability and reproducibility of the catalyst prepared according to the present invention.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for upgrading a sulfur rich heavy naphtha feedstock comprising the steps of:

providing a heavy naphtha feedstock having an initial sulfur content and an initial octane number; and contacting said feedstock with a hydroconversion catalyst system under a hydrogen atmosphere at hydroisomerization temperature and pressure so as to provide a final product having a final sulfur content which is less than the initial sulfur content of the feedstock, and having a final octane number which is substantially equal to or greater than said initial octane number of the feedstock, and wherein the final product has an increased isomerized component and substantially no increase in aromatic content with respect to said feedstock said hydroconversion catalyst comprises (1) a catalytically active matrix, (2) a support medium distributed through the matrix, said support medium comprising a silicious molecular sieve material, and (3) a catalytically active phase supported on the support medium, said catalytically active phase comprising a first metal selected from group IIIA of the periodic table of elements and a second metal selected from group VIB of the periodic table of elements.

2. A process according to claim 1, wherein said feedstock has an initial sulfur content of between about 1 ppm to about 20,000 ppm.

3. A process according to claim 2, wherein said final sulfur content is between about 30% to about 60% less than said initial sulfur content.

4. A process according to claim 1, wherein said final octane number is greater than said initial octane number by between about 2 to about 40.

5. A process according to claim 1, wherein said feedstock is a heavy straight run naphtha, and wherein said final octane number is greater than said initial octane number by between about 30 to about 40.

6. A process according to claim 1, wherein said feedstock is a heavy cracked naphtha, and wherein said final octane which is greater than said initial octane number by between about 2 to about 10 numbers.

7. A process for upgrading a sulfur rich heavy naphtha feedstock, comprising the steps of:

providing a heavy naphtha feedstock having an initial sulfur content and an initial octane number;

contacting said feedstock with a hydrodesulfurization catalyst under a hydrogen atmosphere and hydrodesulfurization temperature and pressure to provide an intermediate product having an intermediate sulfur content less than said initial sulfur content and an intermediate octane number less than said initial octane number; and contacting said intermediate product with a hydroconversion catalyst system under a hydrogen atmosphere at hydroisomerization temperature and pressure so as to provide a final product having a final sulfur content which is less than the intermediate sulfur content, and having a final octane number which is greater than said intermediate octane number, and wherein the final product has an increased isomerized component and substantially no increase in aromatic content with respect to said feedstock said hydroconversion catalyst comprises (1) a catalytically active matrix, (2) a support medium distributed through the matrix, said support medium comprising a silicious molecular sieve material, and (3) a catalytically active phase supported on the support medium said catalytically active phase comprising a first metal selected from group IIIA of the periodic table of elements and a second metal selected from group VIB of the periodic table of elements.

8. A process according to claim 7, wherein said initial sulfur content is between about 50 ppm to about 50,000 ppm.

9. A process according to claim 8, wherein said final sulfur content is at least about 60% less than said initial sulfur content.

* * * * *